United States Patent
Jensen

(10) Patent No.: US 8,973,302 B2
(45) Date of Patent: Mar. 10, 2015

(54) GARDEN TOOL

(71) Applicant: Nongphangaa Boonyarit Jensen, Duchesne, UT (US)

(72) Inventor: Nongphangaa Boonyarit Jensen, Duchesne, UT (US)

(*) Notice: Subject to any disclaimer, the term of this patent is extended or adjusted under 35 U.S.C. 154(b) by 0 days.

(21) Appl. No.: 13/766,825

(22) Filed: Feb. 14, 2013

(65) Prior Publication Data

US 2014/0223814 A1   Aug. 14, 2014

(51) Int. Cl.
*A01G 9/02* (2006.01)
*A01G 9/10* (2006.01)
*A01G 9/00* (2006.01)

(52) U.S. Cl.
CPC ............... *A01G 9/108* (2013.01); *A01G 9/006* (2013.01)
USPC ............................................ 47/66.6; 47/66.7

(58) Field of Classification Search
CPC ......... A01G 9/08; A01G 9/086; A01G 9/088; A01G 9/124
USPC ............. 47/66.3, 66.1, 66.6, 66.7, 73, 86, 87; 294/173, 27.1, 29, 32, 34, 53.5, 176, 294/179, 99.2
See application file for complete search history.

(56) References Cited

U.S. PATENT DOCUMENTS

| | | | |
|---|---|---|---|
| 357,408 A * | 2/1887 | Pittenger | 294/53.5 |
| 2,058,934 A * | 10/1936 | Yohe | 47/79 |
| 3,667,159 A | 6/1972 | Todd | |
| D314,317 S * | 2/1991 | Thomson | D8/5 |
| D362,206 S * | 9/1995 | Nuosce | D11/164 |
| 5,971,653 A * | 10/1999 | Harpell | 403/97 |
| 6,209,258 B1 * | 4/2001 | Schneider | 47/46 |
| 6,546,670 B2 | 4/2003 | Bautner | |
| 7,987,658 B1 * | 8/2011 | Fragale | 56/400.19 |
| 2009/0107041 A1 * | 4/2009 | Hughes et al. | 47/66.7 |
| 2009/0158650 A1 | 6/2009 | Johnson | |

* cited by examiner

*Primary Examiner* — Rob Swiatek
*Assistant Examiner* — Ebony Evans
(74) *Attorney, Agent, or Firm* — Zachary D. Renstrom

(57) ABSTRACT

The invention claim is a garden tool to assist in the removal of planting medium and plant from a planting container. The garden tool comprises a handle having a first end and a second end, a base, and a planting container. The handle and the base are connected forming a L-shape body. The base is placed inside the planting container, and the handle extends above the top of the planting container. The connection between the handle and base may be reinforced by an angle brace. The connection between the handle and base may be hinged. If the connection is hinged, the angle brace prevents the hinge movement. Located on one end of the angle brace is a hook, that connects to the base. In addition, the base has weeping holes to allow the drainage of water. The base also has raised ridges to contain the growing medium when removed.

5 Claims, 4 Drawing Sheets

GARDEN TOOL

BACKGROUND OF THE INVENTION

1. Field of the Invention

A garden tool that allows a user to easily remove plants and the growing medium from a container.

2. Prior Art

This invention is in the field of horticultural containers and is specifically directed to the field of seedling flats of the type in which seeds are planted for initial growth into a seedling to be subsequently transplanted in a field. Moreover, this invention may be used in large scale plant containers where the user wishes to easily remove the planting medium and plant.

In large-scale farming or green house operations seeds are initially germinated in a very controlled environment which controls the temperature, humidity, sunlight, seed spacing, and soil type. By controlling the environment, it increases the probability that the seed will germinate and grow into a seedling.

The plant containers that hold the soil or medium are known in the industry as pony packs, trays, flats, etc. These plant containers are often times arranged in arrays or matrixes cells which provide the initial growth area for the plants. Not only do these containers provide a means of retaining the new plant and its growing medium during the initial growth stages of the plant, but furthermore, these containers provide a means for transporting the new plant to its eventual long-term planting situs.

As the new plant develops, its root structure becomes enmeshed in the growth medium, which is held in the planting container. The plant and planting medium must be removed from the planting container in order to plant the new plant in the soil of its long-term growth situs. The user must pull on the plant or damage the planting container. Given the importance of maintaining a healthy root structure and maintaining the growth medium surrounding the root structure, it becomes important that the user be able to remove the root structure from the container with a minimum disruption of the roots and the planting medium.

Traditionally, users have encountered significant difficulties in safely removing the root structure and planting medium from their respective container. When the root structure of each seedling grows to an extent so as to fill the capacity of its container, it becomes difficult to dislodge the seedling and planting medium from the planting container. Such removal frequently results in damage or injury to the seedlings, not to mention the labor costs involved in the removal of the seedlings from such containers for transplantation. In particular, when the roots of the plant become lodged and root-bound to the inside surface of the pack or pot, the roots are liable to tearing and damage during removal from the packs or pots. In many instances, the user grasps the plant by its stem and attempts to pull the plant root structure from the container. In the previously described circumstances, as the user applies more force to the plan stem to secure the plant's removal from the container, he or she oftentimes breaks the stem of the plant, thereby destroying the plant. In addition, the disruption of the association of the root structure and its associated growth medium can prove damaging to the plant and its long-term survivability.

In instances wherein the growth medium is very wet, grasping the stem and pulling on it often results in the root structure being disassociated from its growth medium. This dissociation prejudices the chances of the plant surviving once it is planted in the soil. In other situations, the user compresses the container or damages the plant container prior to extracting the plant root structure from the container. In these instances, the compression may result in damage to the root structure and damage to the plant container. In all these instances considerable damage and loss of plants have occurred due to the lack of available means of safely removing the root structure and accompanying growth medium from its initial growth container.

Consequently, a number of seedling or plant containers have been proposed in recent years in which the containers are made of a plantable material that is directly transplanted into the ground along with the seedlings, requiring no need for removal of the seedlings from the container. While devices of this type have been fairly satisfactory, they do not possess the necessary rigidity to be easily handled without the aid of additional auxiliary support trays or similar containers.

The extremely large number of seedlings transplanted each year has resulted in the fact that even a savings of a fraction of a cent per seedling will result in a substantial increase in the profits of both the farmer and/or the seedling producer. Accordingly, there is a need to devise an arrangement for dislodging a plant root and its associated growth medium from containers of a generally-used size without damaging the plant and further, to remove the plant in an efficient manner.

As such, it would be beneficial to have an invention that would offer a quick and convenient device that would dislodge each plant together with its roots and growth medium in such a manner that separation of the growth medium from the roots does not occur at the time of transplantation. Such a device would increase the survival chances of replanted plants, and root separation from the growth medium during transplanting would certainly be minimized. In addition, this invention could be utilized in a mechanical means or robot processing to remove the plant and planting medium.

One of the greatest cost factors in providing seedlings for transplantation is the labor involved in handling and delivering the seedlings to the user. Specially designed trays for holding the individual seedling pots have consequently been proposed and used for this purpose. Normally, such support members are usable with only one particular type of seedling container and are not compatible with other containers of different sizes, shapes, and dimensions.

SUMMARY

The present invention relates to a garden tool to be used in assisting the removal of the growing medium and plant from a container. In practice, the garden tool will be placed in the container before the growing medium and plant are placed into the container. The garden tool is comprised of a handle connected to a base forming an L-shape configure. An angle brace reinforces the connection of the handle and the base. The connection between the handle and the base may be hinged. If hinged, the angle brace obstructs the movement of the hinge. Located on the end of the angle brace is a hook that attaches to hole in the base.

Additional features are holes in the base which allow water to drain, yet also allow the base to still hold the growing medium. In addition, the base has small ridges which assist is holding the growing medium. When the user wishes to remove the plant and plant medium, the user simply pulls on the handle.

DESCRIPTION OF THE DRAWINGS

The invention may take form in certain parts and arrangement of parts, and preferred embodiment of which will be described in detail in the specifications and illustrated in the accompany drawing, which for a part hereof.

DETAILED DESCRIPTION OF THE PREFERRED EMBODIMENTS

Figure 1:
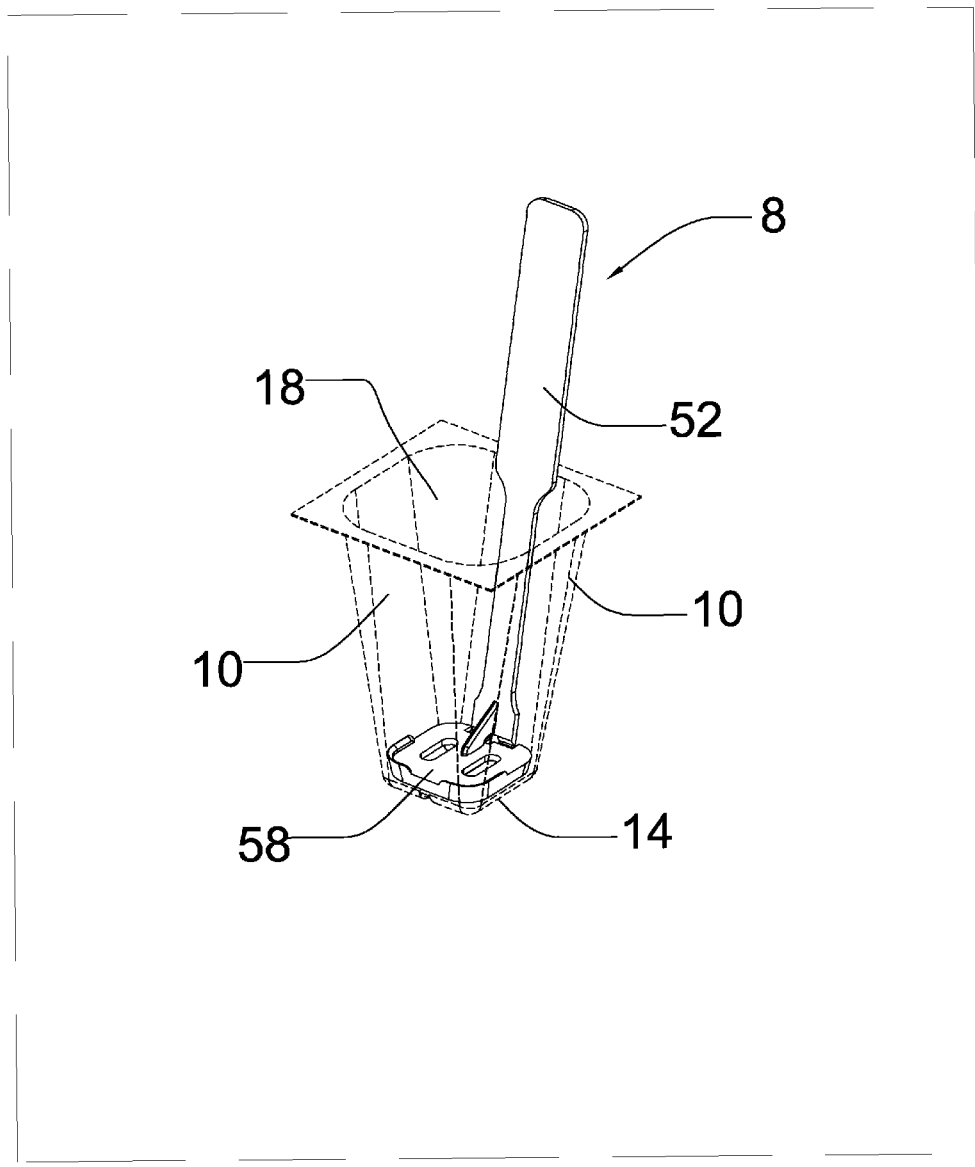
FIG. 1 is a perspective view of the garden tool with a planting container shown in broken lines.
Figure 4:
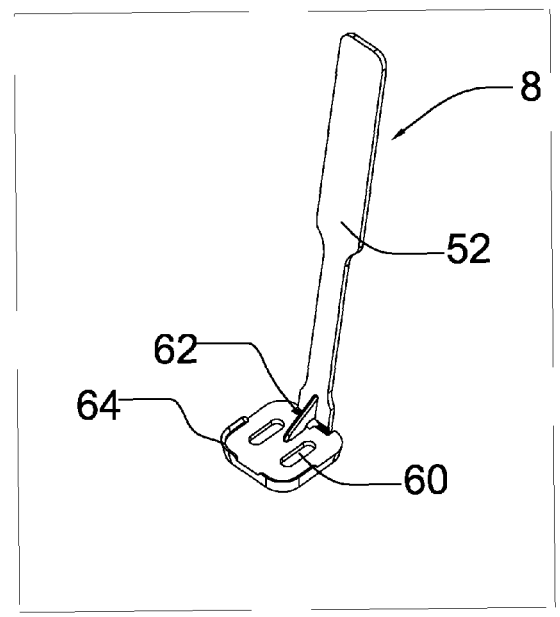
FIG. 4 shows a perspective view of the garden tool.

An embodiment of the garden tool is illustrated in FIG. 1 and FIG. 4. A garden tool 8 has a handle 52 that is connected to a base 58. The garden tool 8 is placed inside a planting container 10. The base 58 is located inside the bottom of the planting container 10. The handle 52 extends out of the top of the planting container 10.

The planting container 10 is generally cylindrical shaped with an open first end 18 located at the top end of the planting container 10 and an interior closed bottom end 14. The garden container 10 may be made from either ridged or flexible material. The general shape of the planting container 10 can vary from square, rectangle, or circular. Planting medium is placed inside the planting container 10. A seed or plant is then placed in the planting medium. Located near the closed bottom end 14 may be located at least one hole or perforation 20, which allows excess water to drain from the planting container 10. The planting containers 10 are generally well known in the art. It should be understood that different types of materials and shapes of the planting containers may be used without departing from the spirit and scope of the present disclosure, and the above description should not be considered as limiting.

As seen in FIG. 4, the garden tool 8 is mostly an L-shape tool with the base 58 forming the lower end and the handle 52 forming the upper end. The length of the handle 52 is such that it extends above the open first end 18 of the planting container 10. The width of the handle 52 is such that it is small enough to fit inside planting container 10 but still sturdy enough that it will not break when removing the planting medium and plant from the planting container 10. The width of the handle 52 may increase near the top longitudinal axis opposite of the connection with the base 58. The increased width allows the user to easily grip the handle 52 and provides an area to place a label.

Figure 2:
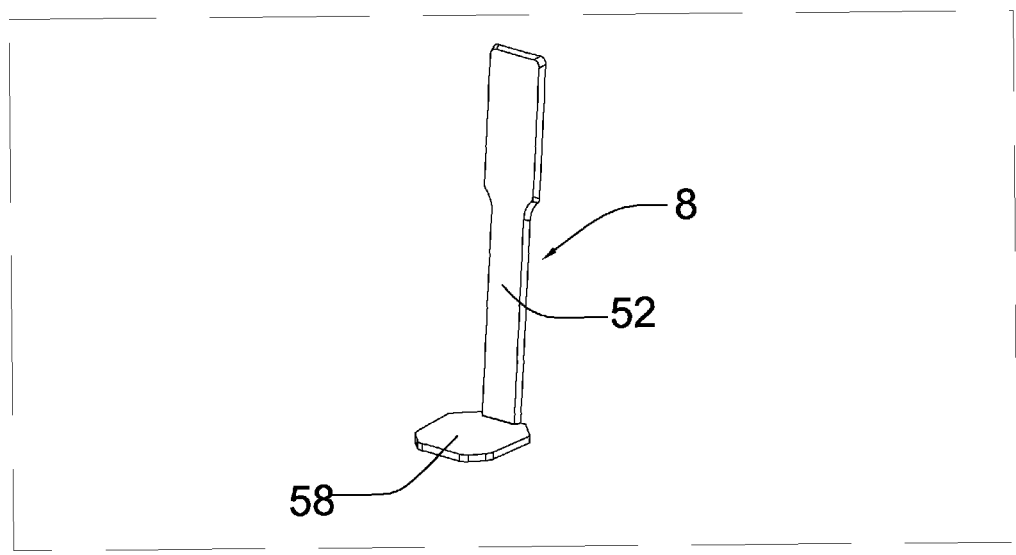
FIG. 2 shows an opposite plan view to that of FIG. 1 of the garden tool.
Figure 3:
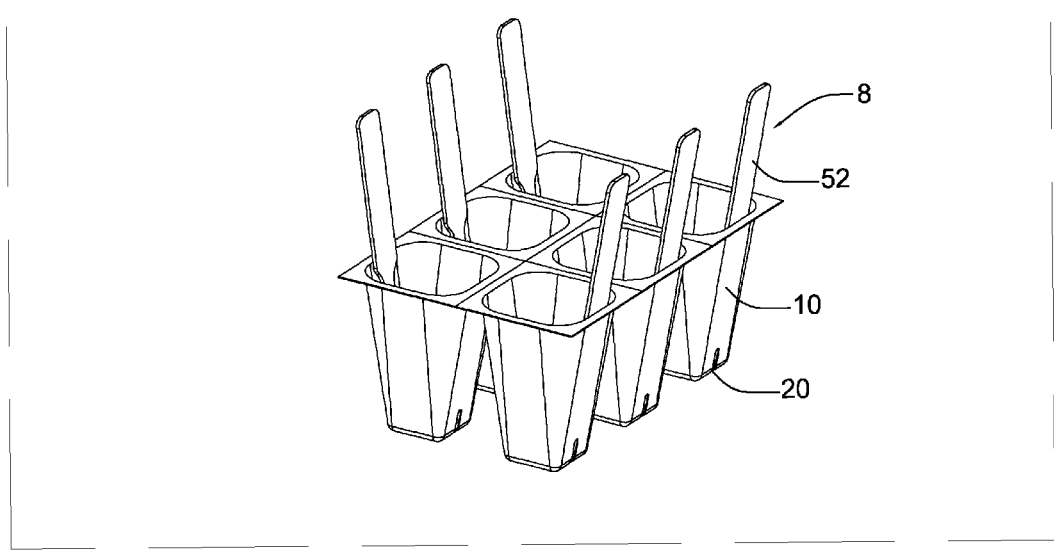
FIG. 3 shows multiple garden tools in a typical multi-cell planting flat or container in the L-shape position. This also shows the angle brace, weep holes and ridges.

The base 58 is generally located at the base of the handle 52 and perpendicular to the longitudinal axis of the handle 52 as seen in FIG. 2. It is preferred that the angle between the handle 52 and the base is similar to the sidewall angle in the planting container 10 sidewall.

Located in the base 58 is at least one weep hole 60. The weep hole 60 is large enough to allow water to freely flow through the opening, although still small enough to prevent the planting material from flowing through the weep hole 60 when removing the planting medium.

Located around at least a portion of the outer circumference of the base 58 is a raised ridge 64. The ridge 64 supports the planting medium when the user is removing the planting medium from a planting container 10. The length of the ridge 64 may vary depending on the size of the planting container 10 and the planting medium. The height of the ridge 64 may be as small as one millimeter or as long as the sidewalls of the planting container 10.

Figure 5:
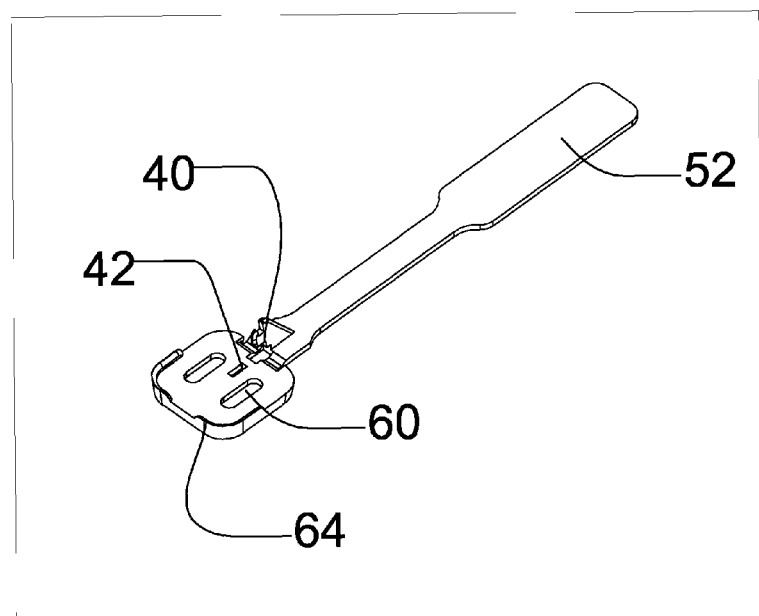
FIG. 5 shows a side view of the garden tool.
Figure 6:
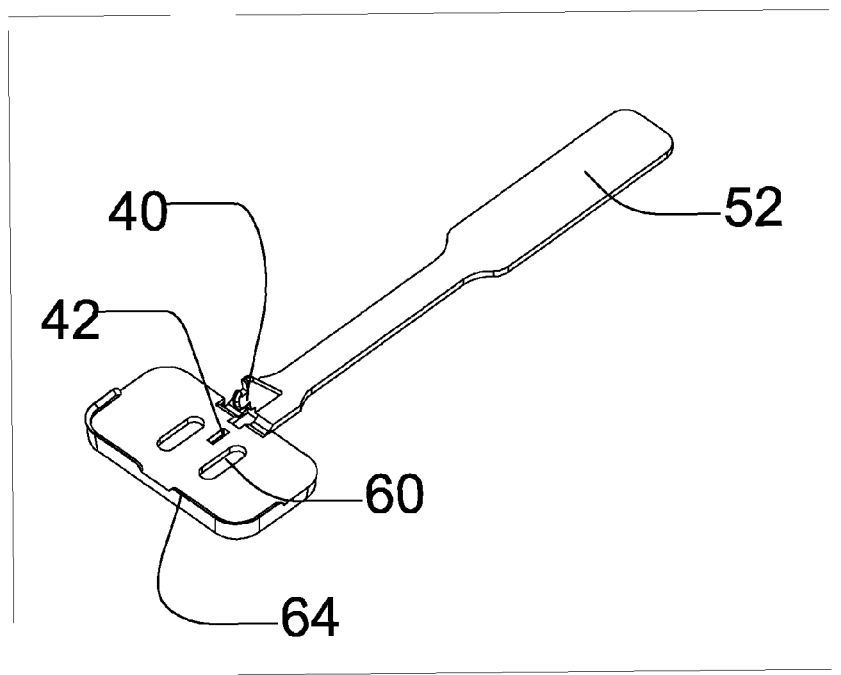
FIG. 6 shows a perspective view of the garden tool, showing the varying sizes of the base.

As shown in FIGS. 4 and 5, to provide additional strength between the handle 52 and the base 58 connection, an angle brace 62 may be used. The angle brace 62 connects to both the handle 52 and base 58. The angle brace 62 generally has a forty-five degree angle on both the handle 52 and base 58.

As shown in FIGS. 4 and 5, the connection between the handle 52 and base 58 may be hinged. If the connection is hinged, the angle brace 62 is required. To allow the hinged connection to operate, one end of the angle brace 62 must be detachable. Usually, the angle brace 62 is permanently attached to the handle 52. Located on the opposite end of the longitudinal axis of the angle brace 62 is a hook 40. When the garden tool 8 is in the L-shape position, the hook 40 is positioned through a receiving hole 42 located on the base 58. The hook 40 latches onto the base 58. The hook 40 is large enough to prevent it from coming unlatched when the user is removing the planting medium and plant from a planting container 10.

While a preferred embodiment of the invention of garden tool 8 has been shown and described herein, it should be understood, that the description above contains many specificities that should not be construed as limiting the scope of the invention. It is intended to cover all of those modifications and variations that fall within the scope of the present invention. Thus, the scope of the embodiment should be determined by the appended claims and their legal equivalents rather than by the examples given.

What is claimed is:

1. A garden tool for removing plants and growing medium from a container, the garden tool comprising:
    a handle having a first end and a second end;
    an angle brace located near the second end;
    the angle brace having a hooking member;
    a base having a receiving hole;
    the handle and the base are joined by means of a hinge;
    wherein the hooking member is placed inside the receiving hole, the hinge is stopped from movement and the handle and base comprise an L-shaped form;
    a planting container;
    wherein the base is placed inside the planting container and the first end extends above the planting container.

2. The garden tool as recited in claim 1, wherein said base has at least one hole, whereby water may seep through said hole.

3. The garden tool as recited in claim 1, wherein said base has a raised edge rim.

4. The garden tool as recited in claim 1, wherein said garden tool is made of plastic.

5. A method of removing a plant root system and surrounding growing medium from a plant container, the method comprising:
    (a) providing a gardening tool comprising a handle having a first end and a second end; an angle brace located near the second end; the angle brace having a hooking member; a base having a receiving hole; the handle and the base are joined by means of a hinge; wherein the hooking member is placed inside the receiving hole, the hinge is stopped from movement and the handle and base comprise an L-shaped form; and providing a planting container; wherein the base is placed inside the planting container and the first end extends above the planting container;
    (b) placing planting medium and plant in said planting container;

(c) applying a pulling force to said first end;
(d) lifting the gardening tool, the growing medium and plant from said planting container.

\* \* \* \* \*